United States Patent
Yazawa et al.

[11] 3,964,646
[45] June 22, 1976

[54] ELECTRIC SIEVE

[75] Inventors: Toshio Yazawa; Fumi Yazawa, both of Kawaguchi, Japan

[73] Assignee: Toshio Yazawa, Kawaguchi, Japan

[22] Filed: Dec. 30, 1974

[21] Appl. No.: 537,178

[30] Foreign Application Priority Data
Mar. 14, 1974  Japan................................ 49-29642

[52] U.S. Cl............................... 222/189; 222/199; 209/332; 209/374; 259/DIG. 42
[51] Int. Cl.²............................................ B07B 1/32
[58] Field of Search............. 222/161, 196.1–196.5, 222/199, 200, 189; 259/DIG. 41, DIG. 42; 241/79.2, 79.3, 168, 169, 169.1; 209/331, 332, 366.5, 374

[56] References Cited
UNITED STATES PATENTS

| | | | |
|---|---|---|---|
| 2,246,497 | 6/1941 | Beck | 222/161 |
| 2,583,862 | 1/1952 | Lichtenstein | 222/199 X |
| 2,664,201 | 12/1953 | Dunn | 209/332 |
| 3,734,417 | 5/1973 | Russell | 241/168 |

*Primary Examiner*—Robert B. Reeves
*Assistant Examiner*—Frederick R. Handren
*Attorney, Agent, or Firm*—Johnson, Dienner, Emrich & Wagner

[57] ABSTRACT

A casing, in which a powdered substance to be sieved is fed, is provided with a handle portion containing a battery therein. A supporting arm extends from the inner wall of the casing and is connected with a vibratable motor cover at the center portion of the casing. A motor is mounted within the motor cover, and a weighted member is eccentrically connected to the output shaft thereof. The meshed member of the sieve is connected to the motor cover.

5 Claims, 7 Drawing Figures

ELECTRIC SIEVE

BRIEF SUMMARY OF THE INVENTION

This invention relates to an electric sieve to be used for spraying fine particles or powdered substance and, more particularly, to an electric sieve suited for use with cooking or baking.

In the cooking or baking art, it is often desirable, such as when making a cake, that fine particles or powdered substances such as sugar and wheat flour, be homogeneously mixed with water or other liquids. When mixing the wheat flour with water, if the wheat flour is directly dropped in the water from a small mouth of a bag thereof, or from a spoon having the wheat flour thereon, the wheat flour will partially lump, since the flour cannot homegenously contact the water. If the mixture is stirred enough to eliminate the flour lumps, the mixture becomes sticky and often spoils the taste of the cooked cake and such.

Accordingly, in order that the wheat flour may homogeneously be sprayed in the water without forming lumps thereof, it is desirable that the flour be sprayed by using a sieve and be rapidly mixed with the water. To spray the flour by using a sieve, manually, a cook has to shake the sieve with one hand, and rapidly mix the sprayed powder material with the water by using a stirrer with his other hand in a stirring motion. However, this operation of different movements of both hands at the same time, can be quite difficult, especially for a housewife.

Accordingly, an object of the present invention is to provide an electric sieve which can easily be held and operated by one hand of a housewife and can homogeneously spray fine particles or powdered substance therefrom.

Another object of the present invention is to provide an electric sieve which is compact, simple in structure and reliable in its operation.

Other objects and features of the present invention will become apparent from the following detailed description of specific embodiments thereof.

DETAILED DESCRIPTION OF THE INVENTION

Figure 1:
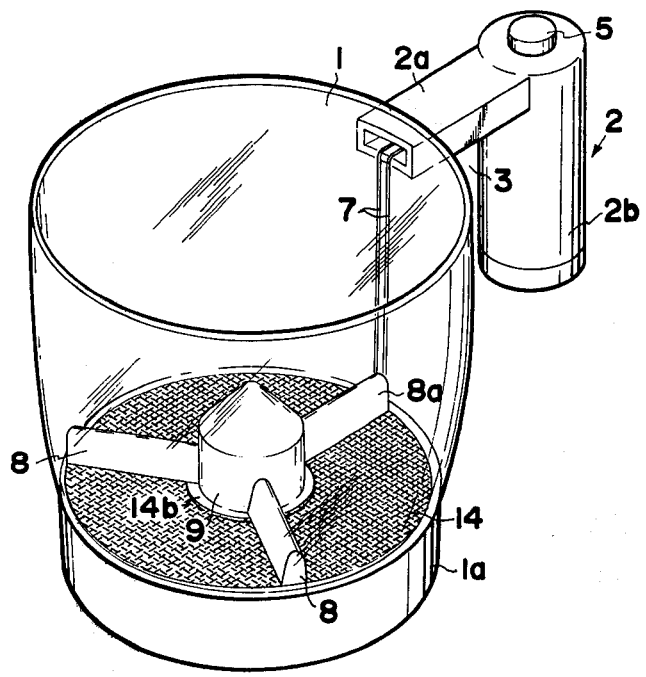
FIG. 1 is a perspective view showing an electric sieve according to one embodiment of the present invention.
Figure 2:
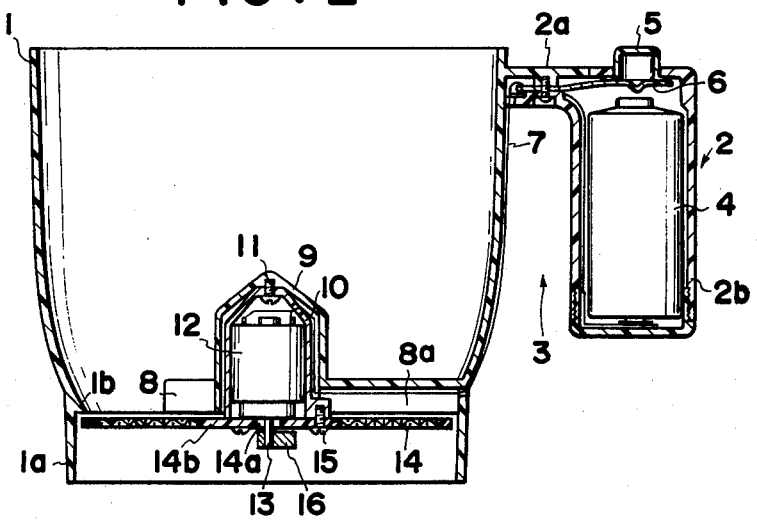
FIG. 2 is a vertical sectional view of the electric sieve shown in FIG. 1.
Figure 3:
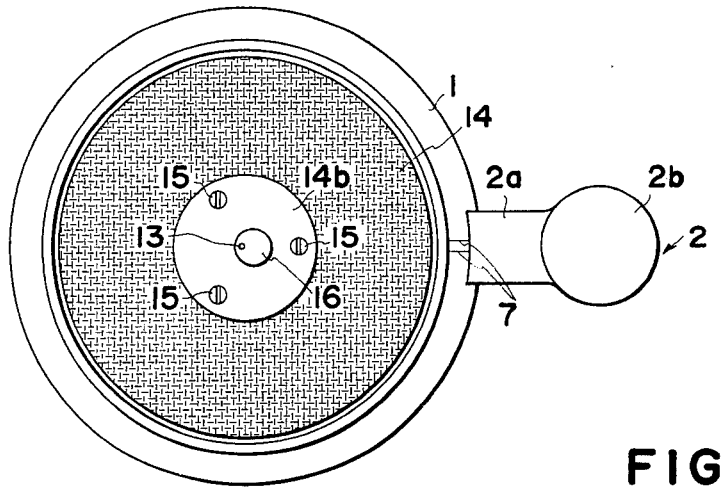
FIG. 3 is a bottom view of the electric sieve shown in FIG. 1.

Referring to the first embodiment shown in FIGS. 1 to 4, there is provided a generally cylindrical casing 1 at the outer side of which a handle 2 is integrally formed from a synthetic resin. The handle 2 has a relatively thin flat portion 2a extending horizontally from the outer surface of the casing 1 near the upper end thereof, and a cylindrical hollow portion 2b extending vertically from the outer end of the flat portion 2a, thereby leaving a vertical space 3 between the outer surface of the casing 1 and the cylindrical portion 2b of the handle 2 to allow easy holding of the handle. A battery 4 is provided in the cylindrical hollow portion 2b of the handle, and a switch button 5 projects above the portion 2b, adapted to complete an electrical circuit and cause an electric current to flow to a motor (referred to hereinafter) through a conductive plate 6 and lead wires 7 by operation thereof.

Extended inwardly from the inner surface of the wall of the casing 1 near the lower part thereof are three arms 8 for supporting a small housing 9 substantially at the center of the casing. These arms 8 are spaced at substantially the same angular intervals and one of the arms 8a is located directly below the inner end of the flat handle portion 2a. These arms 8 and 8a and the small central housing 9 are also integrally formed with the casing 1 from the synthetic resin.

Figure 4:
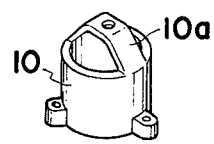
FIG. 4 is a perspective view showing the motor cover with which the electric sieve of FIG. 1 is equipped.

A cylindrical motor cover 10 is disposed within the small central housing 9 providing a small annular space between the inner peripheral wall of the housing and the outer peripheral wall of the motor cover 10. The motor cover 10 has, as shown in FIG. 4, an integral plate-like upper bridge portion 10a extending across the upper rim of the cylindrical motor cover 10 and is connected to the housing 9 by a screw 11 threaded through the upper end of the bridge portion 10a into the inner upper wall of the housing 9.

An electric motor 12 is snugly received and secured within the motor cover 10 and has an output shaft 13 extended downwardly through a center opening 14a of a meshed member 14 such as a wire net.

The meshed member 14 is firmly connected to the motor cover 10 by screws 15 passing through an imperforate annular portion 14b of the meshed member 14. The peripheral edge of the meshed member 14 is slightly spaced from the inner peripheral wall of the annular sleeve portion 1a at the lower end of the casing 1 but extending radially beyond an annular flange or shoulder 1b provided at the upper end of the sleeve 1a, thereby allowing the meshed member 14 to vibrate inside of the sleeve 1a below the flange or shoulder 1b.

A disc-shaped weight member 16 is eccentrically connected to the output shaft 13 of the motor below the meshed member 14.

The motor 12 is electrically connected to the battery 4 in the handle 2 by lead wires 7 which pass through a hole in the motor cover 10 and the supporting arm 8a and along the outer surface of the casing 1 and reach to the conductive plate 6 in the flat handle portion 2a.

When one intends to spray the fine particles or powdered substance by the present electric sieve, the sieve is lifted by holding the handle 2 and carried to a desired place where the powdered substance is to be sprayed. Then, after supplying the powdered substance in the casing 1, the switch button 5 is pressed down to complete the circuit and cause electric current to flow from the battery to the motor 12. As is apparent from the disclosure set forth above, when the motor 12 is actuated, the eccentric disc 16 rotates by the rotation of the output shaft 13, so that the motor cover 10 secured to the motor vibrates in the space inside of the housing 9. Thus, the meshed member 14 connected to the motor cover 10 also vibrates, thereby homogeneously spraying the powdered substance through and below the meshed member 14. The vibration of the meshed member 14 stops instantaneously when the pushing force on the switch button is released.

Figure 5:
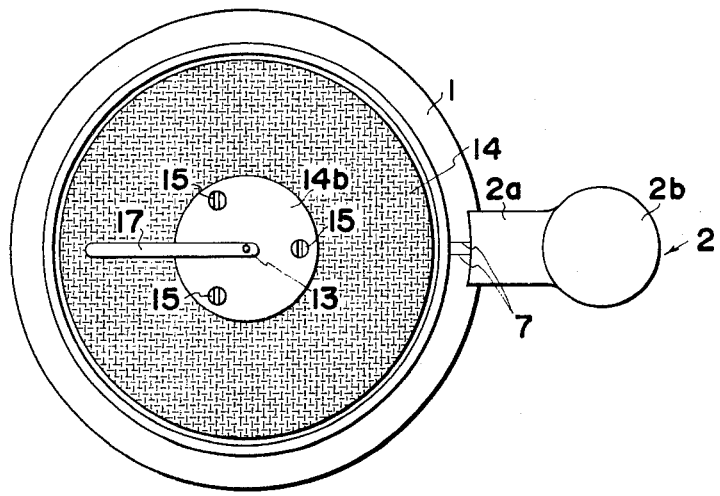
FIG. 5 is a bottom view showing an electric sieve according to a second embodiment of the present invention.

Though the disc-shaped weight member 16 is eccentrically connected to the output shaft 13 of the motor 12 in the first embodiment, a bar-shaped weight member 17 may be used in place of the disc-shaped weight member by connecting one end thereof to the output shaft 13 of the motor 12 as shown in the second embodiment of FIG. 5.

Figure 6:
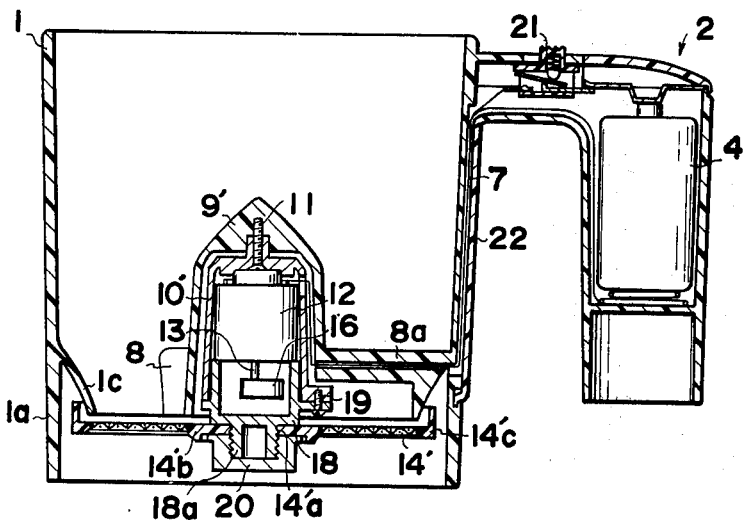
FIG. 6 is a vertical sectional view showing an electric sieve according to a third embodiment of the present invention.

Another modification of the present invention will be described with reference to a third embodiment shown in FIG. 6. In this embodiment the disc-shaped weight member 16, which is connected to the output shaft 13 of the motor 12, is disposed in the motor cover 10' above the meshed member 14'. The lower open end of the motor cover 10' is closed by a closure member 18 fixed thereto by screws 19. The closure member 18 has a central threaded extension 18a extending downwardly through the central opening 14'a in the meshed member 14'. The meshed member 14' is secured to the closure member 18 by a cap nut 20 threadedly engaging the extension 18a against the imperforate annular portion 14'b of the meshed member 14'. The meshed member 14' has an annular vertical flange 14'c around the periphery thereof, which is partially received within an annular recess defined by the outer sleeve 1a and the sleeve 1c at the lower end portion of the casing 1 and spaced from both of the sleeves 1 a and 1c to allow the vibration of the meshed member 14'. In place of the push-type switch 5 in the first embodiment, a slide switch 21 is provided in the flat handle portion 2a, and the lead wires 7 running along the outer wall of the casing 1 are covered by a wire cover 22. Other remaining features of this embodiment are substantially the same as those of the first embodiment except design features.

Figure 7:
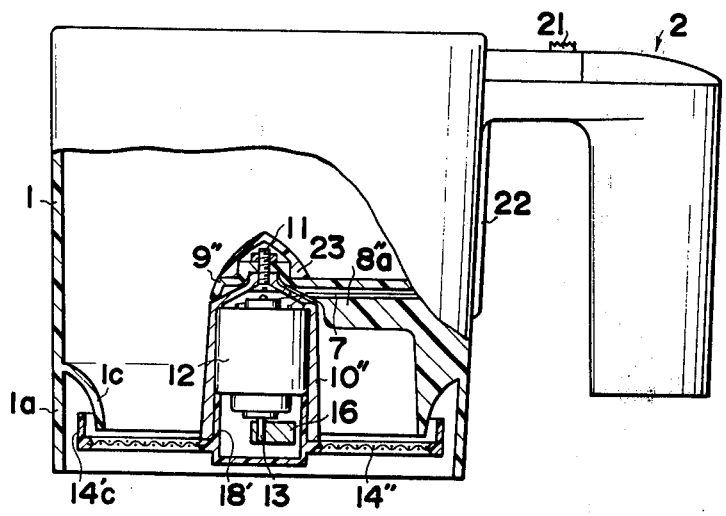
FIG. 7 is a vertical sectional view, partly in elevation, showing an electric sieve according to a fourth embodiment of the present invention.

A further modification of the present invention will be described with reference to the fourth embodiment shown in FIG. 7. In this embodiment, only one arm 8''a is integrally formed with the casing 1 and terminates at the center ring portion 9'' to which the motor cover 10'' is connected by the screw 11. Different from the housing 9 or 9' in the previous embodiments, the center ring portion 9'' of this embodiment does not substantially enclose the motor cover 10''. The meshed member 14'' is integrally formed with a closure member 18' which is welded to the lower free end of the motor cover 10''. The upper surface of the center ring portion 9'' is covered by a cap 23. The other remaining features are substantially the same as those of the third embodiment shown in FIG. 6.

The electric sieve according to the present invention is so constructed that fine particles or a powdered substance can be sprayed very easily only by holding the handle portion 2 thereof and operating the switch button 5 or 21. Further, it is very light in weight and cheap to manufacture when the casing 1, handle portion 2, arms 8 or 8''a and central housing 9 or ring portion 9'' are all integrally formed from synthetic resin. Moreover, since the vibratory movement of the meshed member is attained by the weight member 16 or 17 eccentrically attached to the output shaft 13 of the motor 12 secured within the motor cover 10, which is vibratable with respect to the supporting arm member to which the meshed member 14 is connected, it is very simple in structure and reliable in operation. Further, it is very easy to exchange the meshed member for another one of different mesh size.

Although the present invention has been described with reference to the preferred embodiments thereof, modifications and alterations may be made without departing from the spirit of the present invention.

What is claimed is:

1. An electric sieve comprising:
    a casing adapted to contain fine particles or a powdered substance to be sifted,
    a handle portion connected to said casing adapted to be grasped by one hand of an operator, for holding the sieve,
    a supporting arm extending from the inner wall of said casing to the center portion thereof,
    a motor cover connected to said supporting arm at the center portion of said casing,
    an electric motor secured within said motor cover and having an output shaft extending downwardly therefrom,
    a weight member eccentrically connected to said output shaft of said motor,
    a meshed member disposed within said casing adjacent the lower end portion thereof,
    means for mounting said meshed member for vibration by rotation of said output shaft upon actuation of said motor,
    means for supplying electric current to said motor for actuation thereof,
    inner and outer annular flange members at the lower part of said casing and spaced apart to provide an annular recess therebetween, and
    a vertically extending annular flange around the periphery of said meshed member partially received within said annular recess.

2. An electric sieve as defined in claim 1, wherein said electric current supply means comprises a battery contained in said handle portion and a switch provided on said handle portion for electrically connecting said battery to said motor.

3. An electric sieve as defined in claim 1, wherein said motor cover has an integral upper bridge portion through which a screw is threaded to connect said motor cover to said supporting arm.

4. An electric sieve as defined in claim 1, wherein said supporting arm has a small housing at the lower center part of said casing, and said motor cover is disposed within said housing to provide an annular space between the inner peripheral wall of said housing and the outer peripheral wall of said motor cover.

5. An electric sieve as defined in claim 1, wherein said weight member is an eccentric disc.

* * * * *